Oct. 26, 1965 F. P. COCCHIARALEY ETAL 3,213,472
SURFACE CLEANING APPARATUS
Filed Aug. 14, 1959 7 Sheets-Sheet 1
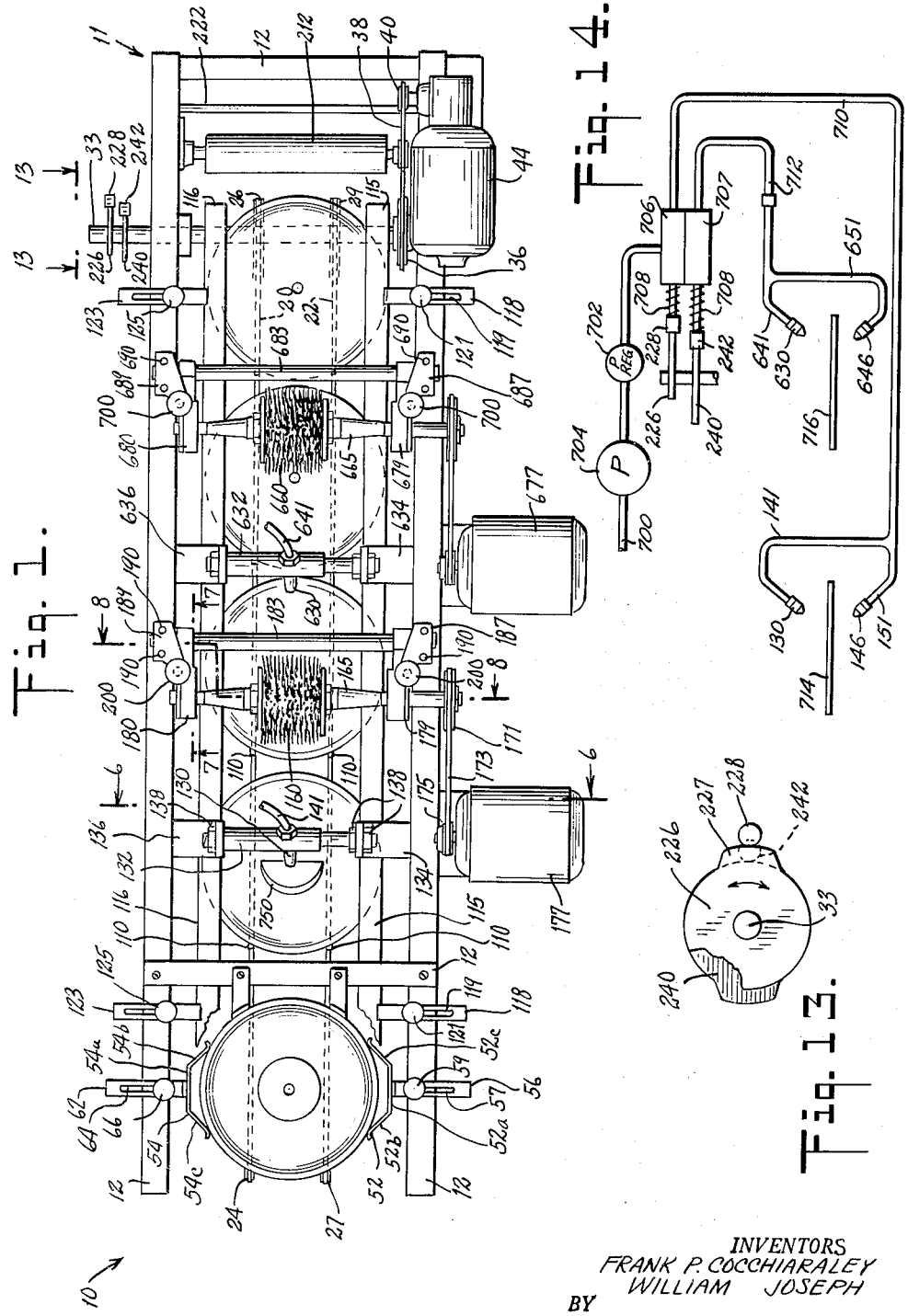
INVENTORS
FRANK P. COCCHIARALEY
WILLIAM JOSEPH
BY
Darby & Darby
ATTORNEYS

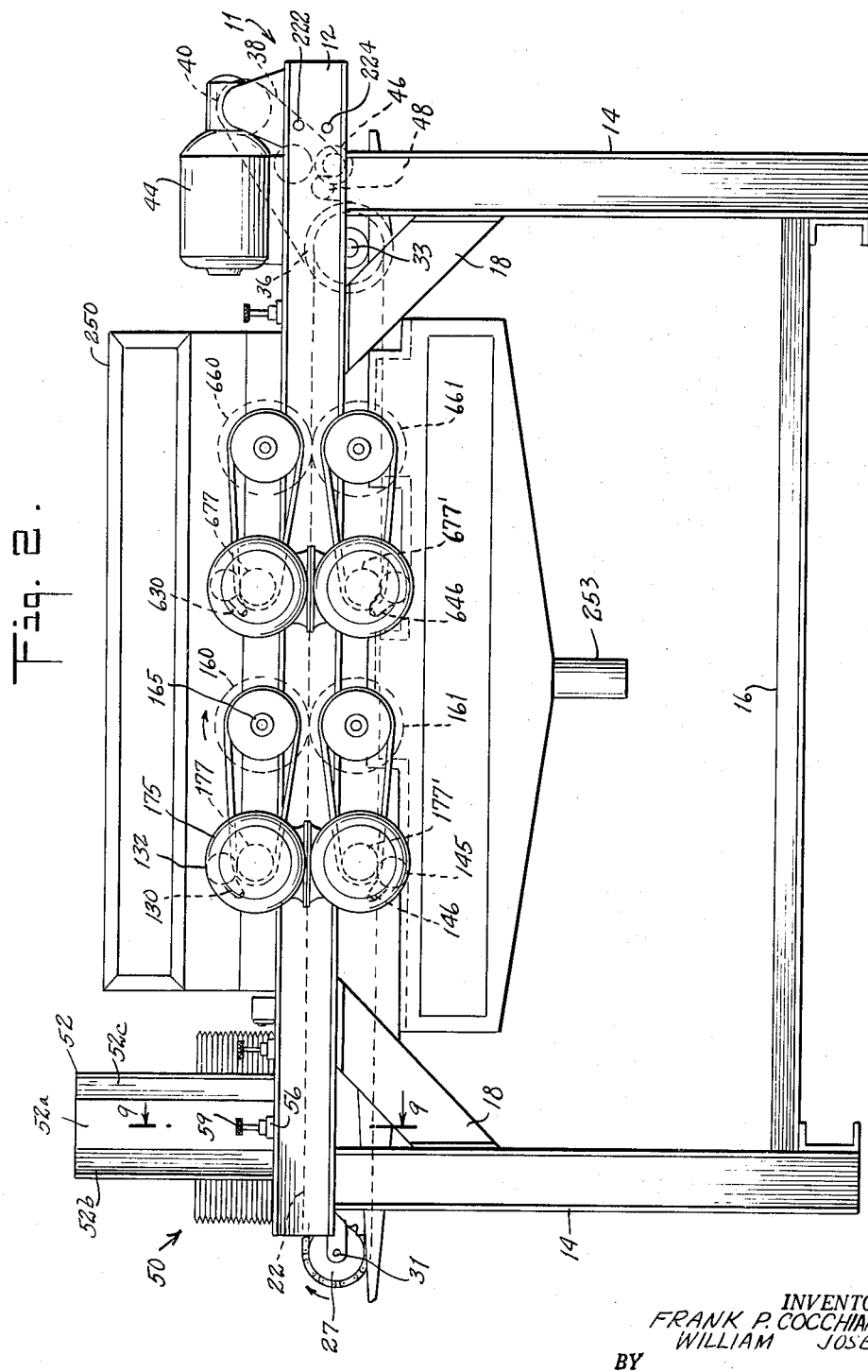

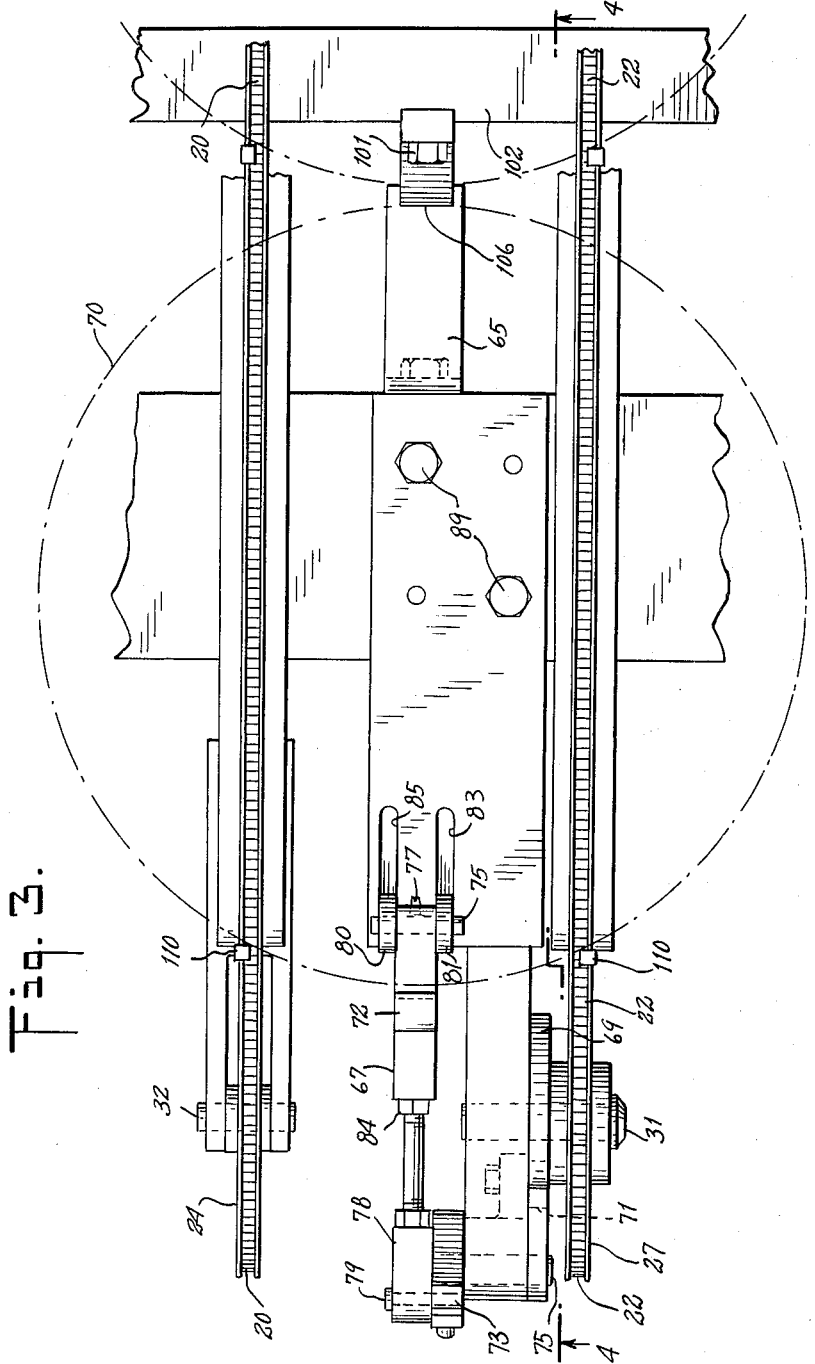

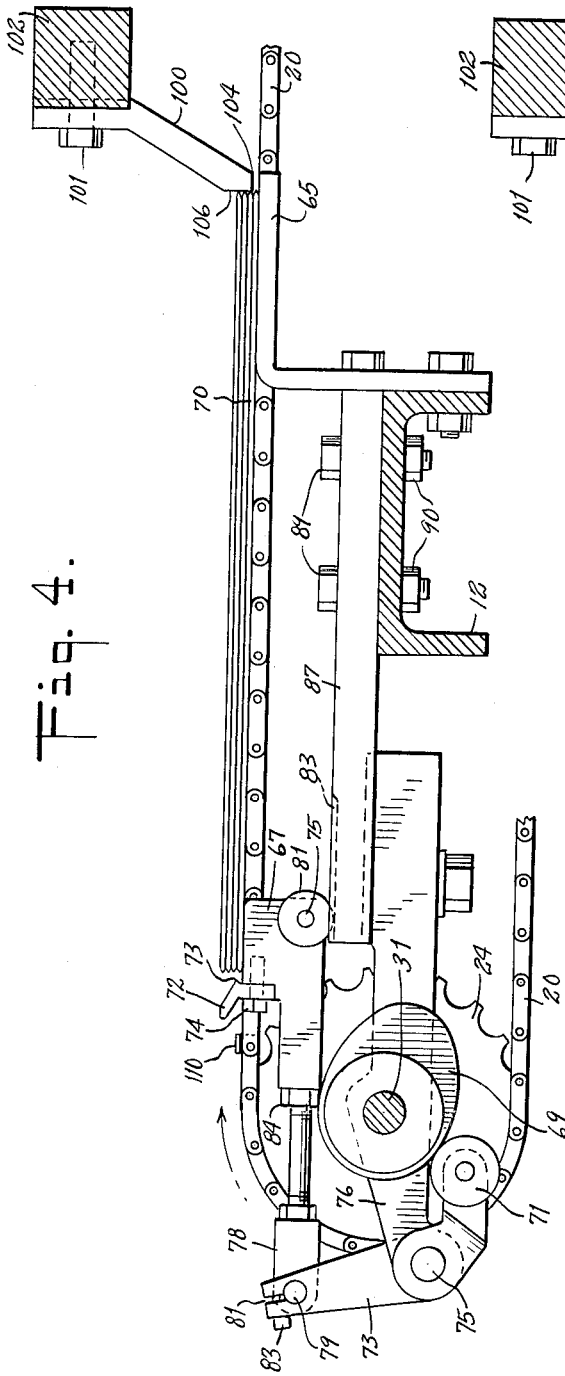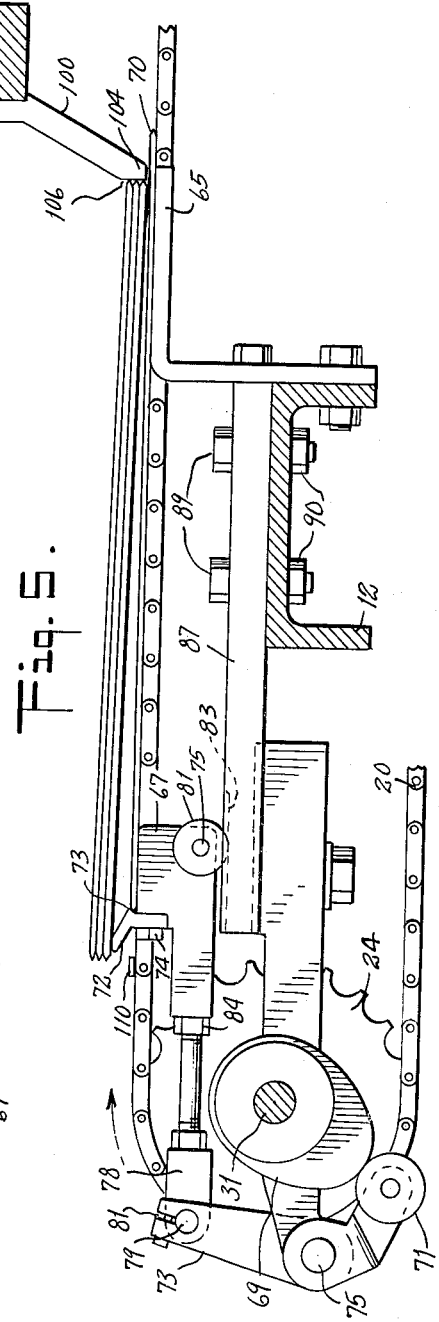

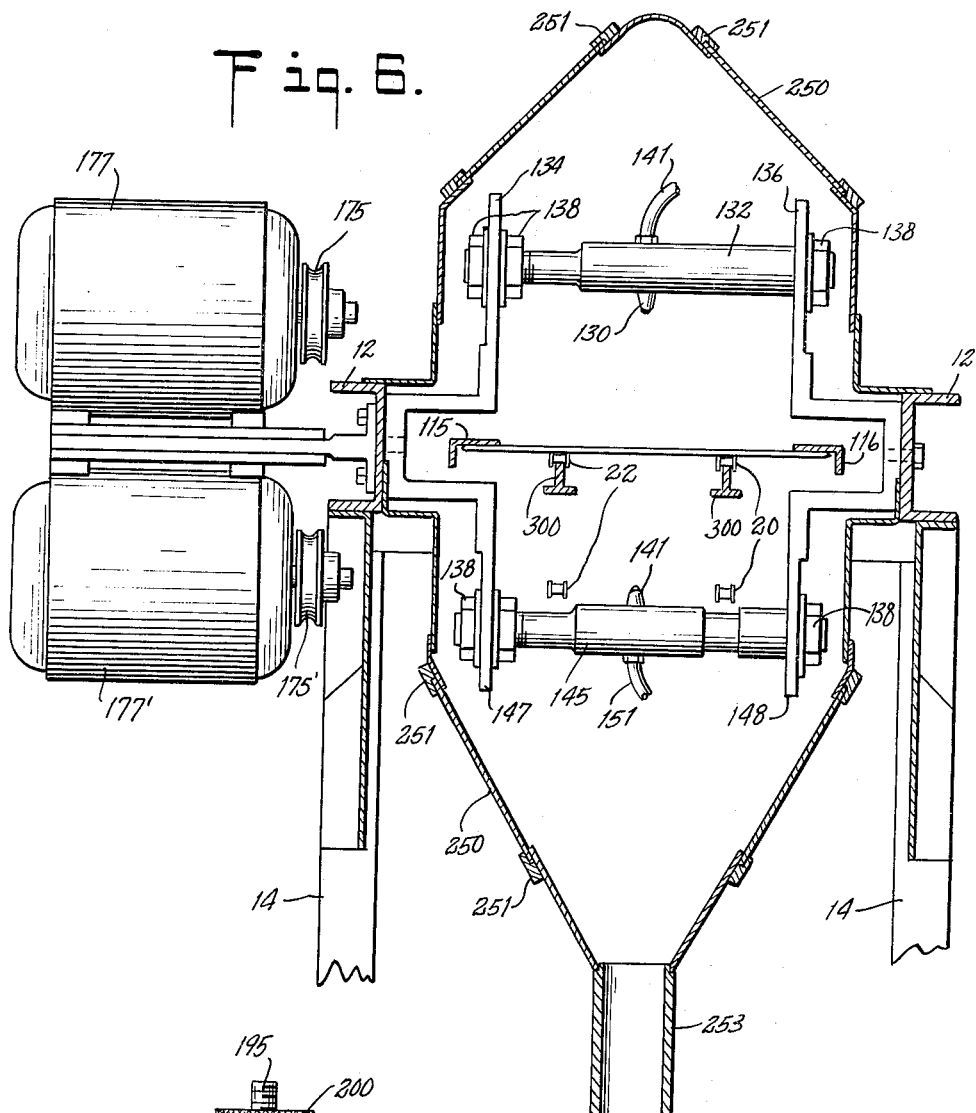
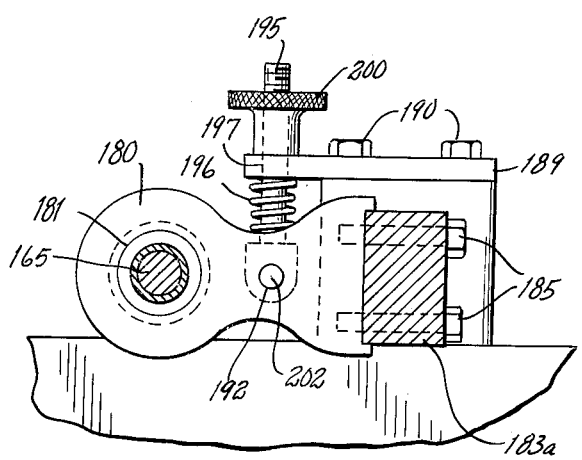

Oct. 26, 1965 F. P. COCCHIARALEY ETAL 3,213,472
SURFACE CLEANING APPARATUS
Filed Aug. 14, 1959 7 Sheets-Sheet 6

INVENTORS
FRANK P. COCCHIARALEY
WILLIAM JOSEPH
BY
Darby & Darby
ATTORNEYS

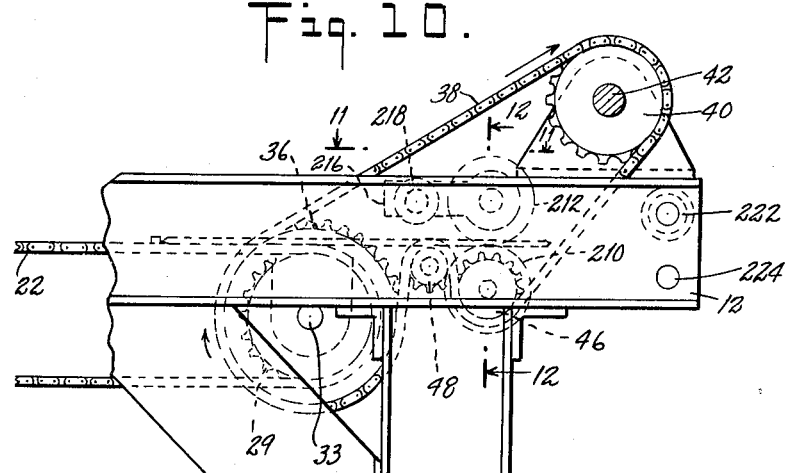
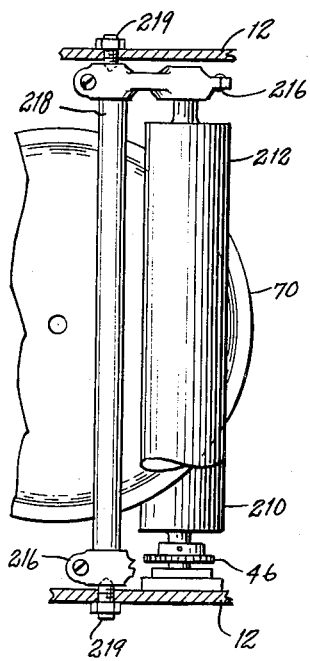
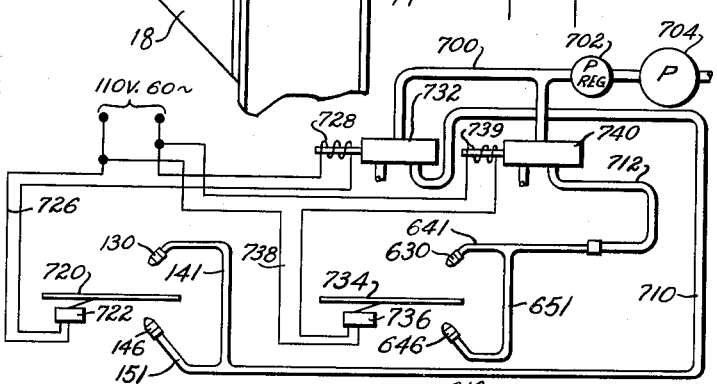
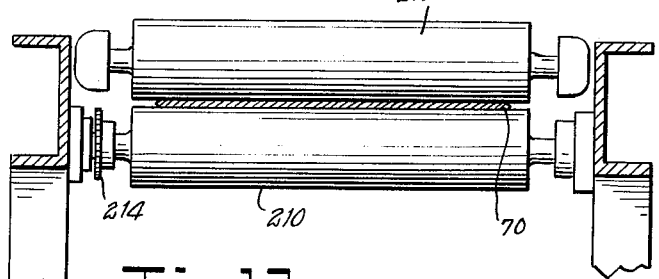

Patented Oct. 26, 1965

3,213,472
SURFACE CLEANING APPARATUS
Frank P. Cocchiaraley, Bloomfield, and William Joseph, Livingston, N.J., assignors to Metro-Goldwyn-Mayer, Inc., a corporation of Delaware
Filed Aug. 14, 1959, Ser. No. 833,859
6 Claims. (Cl. 15—77)

The present invention relates to apparatus and systems for surface cleaning an article and more particularly to an apparatus and systems for removing foreign material such as grime, dirt, grease, labels attached to or coated on a surface of an article and even more particularly to apparatus and systems for removing labels glued or otherwise secured to the surface of articles such as phonograph records.

Heretofore, in removing coated or attached surface matter, such as labels, from finished products, some type of abrasive operation was normally required, such as grinding, or scraping, which entailed removing a portion of a layer of the material of the products, thereby proving wasteful as well as oftentimes marring or deforming the surface of the article. The present invention removes the coated foreign material in a manner not detrimental to the surface of the article and at the same time cleans the article of any dirt or dust.

While this invention will be discussed primarily in terms of removing labels from phonograph records, this is not means in any limiting sense. In the phonograph record field, labels are concentrically and fixedly applied to each side of a phonograph record during the fabricating of the record. The labels on the records, normally contain the name of the maker or distributor, the name of the recording artists, the title of the work thereon, and a wide variety of other miscellaneous information easily seen on any standard record label.

Phonograph records today are primarily made from a thermoplastic material which is relatively expensive. The thermoplastic material upon being heated to a predetermined temperature is pressed in a mold having the desired grooves. Any trim on the records is removed. In the course of producing phonograph records, a careful procedure is followed for inspecting the pressed records prior to the packaging of the records to be certain that only acceptable records are distributed. The rejected phonograph records are removed from the output flow and assembled for further operation or removal. The rejected phonograph records made from thermoplastic material are usually reworked for use as the raw material for the making of new records. For this scrap record material to be reworked to produce new records, all traces of the labels placed thereon, as well as all dirt, dust and grime must be removed to avoid contaminating the records produced from the scrap and producing more rejects. Heretofore, the central portion of these scrap records were mechanically ground, removing all traces of the label therefrom. The grinding operation necessitated also removing portions of the record itself to be certain all the label was removed, hence being a wasteful, costly and dirt producing operation.

The present invention is particularly concerned with removing fixedly secured surface impurities, such as by gluing and the like, from a finished product in a simple, easy manner without damaging or marring the surface of the finished product.

Another object of the present invention is to provide an apparatus that will remove attached surface impurities from uneven surfaces of articles.

It is another object of the present invention to provide an apparatus that will clean attached surface impurities from both sides of a relatively uniform, liquid resistant article without damaging the article or marring its surface.

A further object of the present invention is to remove labels from phonograph records without physically grinding or otherwise removing the record material.

Another object of the present invention is to provide an apparatus that will accept a continuous input flow of flat impermeable articles and remove any material fastened on said articles in a manner causing no dust or contamination of the air and yet allowing the article to leave said apparatus clean and ready for packaging or the next operation.

Still another object of the present invention is to provide a cleaning apparatus for removing securely attached surface impurities on an article having a non-uniform surface using a high velocity, directed stream of liquid.

A still further object of the present invention is to provide a surface cleaning apparatus that accomplishes all of the above and which is compact and sturdy in construction, reliable in use, easy to operate and readily and economically manufactured and serviced.

Other objects and features of the invention will be apparent when the following description is considered in connection with the annexed drawings, in which:

FIG. 1 is a plan view of one form of an apparatus according to the present invention, having its outer covering removed;

FIG. 2 is a side elevational view of the present invention with its outer covering removed;

FIG. 3 is an enlarged schematic plan view of the feeder mechanism of the present invention;

FIG. 4 is a partial cross-sectional view taken along line 4—4 of FIG. 3;

FIG. 5 shows the apparatus of FIG. 4 with the article feed mechanism advanced;

FIG. 6 is a cross-sectional view taken along line 6—6 of FIG. 1 with the outer covering in place;

FIG. 7 is an enlarged partial cross-sectional elevational view taken along line 7—7 of FIG. 1;

FIG. 10 is a broken away elevational view of the drive for the chain belt;

FIG. 11 is a partial broken away, plan view of the output feed roller taken along line 11—11 of FIG. 10;

FIG. 12 is a partial cross-sectional view taken along line 12—12 of FIG. 10;

FIG. 13 is an enlarged elevational view of the control for the hydraulic feed mechanism taken along line 13—13 of FIG. 1;

FIG. 14 is a schematic diagram showing the high pressure fluid supplied to the spray nozzles; and FIG. 15 is a schematic diagram showing an alternate method of actuating the high pressure spray.

Figure 8:
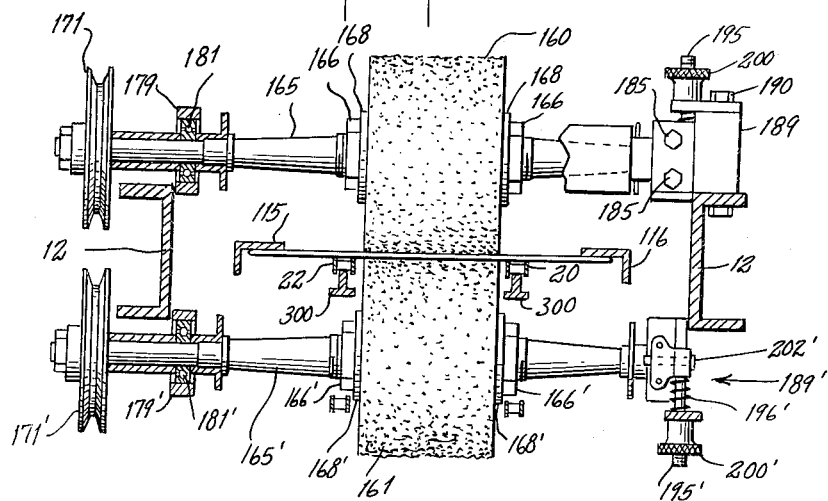
FIG. 8 is an enlarged diagrammatic partial cross-sectional view showing the brush assembly taken along line 8—8 of FIG. 1.

The present invention relates primarily to apparatus for removing a label, seal or other such object that is secured or attached to a relatively flat article, such as by pasting, gluing, or bonding. The embodiment of the present invention shown in the drawings and described hereinafter removes periodically a single record from a supply bin, passes these records in spaced sequential relationship therethrough and simultaneously removes the labels from both sides of the phonograph records passing therethrough.

The apparatus designated generally at 10 is supported on a substantially rectangular frame 11 made of U sections 12 supported by a plurality of legs 14. Adjacent the lower portions of legs 14 are attached crossbars 16 for bracing and strengthening legs 14. Similarly, attached to the upper portion of legs 14 and U members 12 of the rectangular frame are cross braces 18. Frame 11, legs 14, cross arms 16 and cross braces 18 are securely held together and fastened to each other by means of rivets, bolts, welding or other like manner.

A pair of horizontally aligned and parallel conveyor chains 20 and 22 rotate about sprocket wheels 24 and 26 and 27 and 29 respectively. Sprocket wheels 24 and 27 are rotatably supported at one end of frame 11 and sprocket wheels 26 and 29 are rotatably supported at the other end of frame 11. As best seen in FIG. 3, sprockets 27 and 24 are keyed to shafts 31 and 32 respectively. Sprockets 26 and 29 are keyed to a shaft 33. Shafts 31, 32 and 33 are journaled and mounted in rectangular frame 11 in any suitable manner. Conveyor chains 20 and 22 are continuously rotated in the sense indicated by the arrow adjacent sprocket wheel 27 in FIGURE 2.

As shown in FIGURES 1, 2 and 10, shaft 33 has keyed thereon a sprocket wheel 36. Sprocket wheel 36 is rotated in a clockwise manner as shown in FIGURE 10 by a chain 38 driven by a sprocket wheel 40 on a shaft 42. Shaft 42 is rotated by a motor 44. Chain 38 also drives a sprocket wheel 46 discussed hereinafter and is properly tensioned by use of an idler roller 48.

Mounted on frame 11 above conveyor belts 20 and 22 adjacent the input of unit 10 is a reservoir or storage supply designated generally at 50 of the articles to be cleaned and worked, which in the apparatus described are records. Reservoir 50 has two vertical members 52 and 54 spaced apart and facing each other. As shown best in FIGURES 1, 2 and 9, vertical members 52 and 54 are identical and only member 52 will be described. Vertical member 52 is three-sided having a base 52a with a pair of outwardly flared arms 52b and 52c. A vertically oriented stack of horizontally disposed records is aligned between vertical members 52 and 54, so that the plane in which lie the spindle holes or center of the vertical stack of records is disposed substantially equidistant from conveyor chains 20 and 22. The ends of arms 52b, 52c, 54b and 54c contact the peripheral edges of the individual records in the vertical stack of records providing a uniform vertical alignment of the record stack. Vertical members 52 and 54 are adjustable transverse to the longitudinal axis of unit 10. Fixedly secured to the lower portion of base 52b of vertical member 52 is a projecting arm 56 having a longitudinal slot 57 therethrough. Beneath slot 57 in U-shaped member 12 of base 11 is a threaded opening which receives a threaded lockscrew 59. Lockscrew 59 has a portion of its base overlapping opening 57, so that upon lockscrew 59 being threaded into the opening in U member 12, the overlapping portion of lockscrew 59 frictionally locks arm 56 in place upon lockscrew 59 being tightened thereby fixedly positioning vertical member 52. Similarly, vertical member 54 has an outwardly extending arm 62 having an elongated opening 64 therethrough. A lockscrew 66, similar to lockscrew 59, is passed through opening 64 and is received into a threaded opening in U shaped member 12, so that the overlapping portion of lockscrew 66 frictionally locks vertical member 54 in place upon lockscrew 66 being tightened. Arms 52b and 52c of vertical member 52 and arms 54b and 54c of vertical member 54 are so positioned that records placed therebetween have their spindle openings generally aligned with the center line between conveyor chains 20 and 22.

The records to be cleaned are vertically stacked between vertical arms 52 and 54 with an edge of the lowermost record of the vertical stack, designated as 70, resting on the upper flat surface of a rear support 65 and the opposite edge of record 70 resting on the upper surface of a feed carriage 67, as seen best in FIGS. 4 and 5. In this position record 70 is slightly above the upper surfaces or work receiving surfaces of conveyor chains 20 and 22 respectively, so that there is no sliding contact between the work receiving surfaces or upper surfaces of the conveyor chains 20 and 22 and the bottom surface of record 70.

As seen best in FIGURES 3, 4 and 5, sprocket shaft 31 has a cam 69 fixedly keyed thereto. A roller cam follower 71 is maintained in constant contact with the outer peripheral surface of cam 69. Cam follower 71 is rotatably mounted on follower arm 73. Follower arm 73 is pivotally mounted about a shaft 75 which shaft 75 is supported from an arm 76 extending from frame 11. The other end of roller follower 73 is pivotally connected to one end of a rod 78 by a connecting rod pin 79. This end of follower arm 73 has a slit 81 therein, which slit is transverse to connecting rod pin 79 for ease in assembling follower arm 73 to pin 79. Each of the arms of the bifurcated end of follower arm 73 has a threaded transverse opening for receiving a bolt 83 for adjusting the fit between the mating surfaces of follower arm 73 and pin 79. The opposite end of connecting rod 78 is threadly secured to feed carriage 67.

As seen best in FIGURES 4 and 5, carriage 67 is in the shape of a modified L with a thickened base portion. Connecting rod 78 is threadedly received in the end of the arm of the L of carriage 67. Threadedly mounted on connecting rod 78 is a jam nut 84 which is threaded so as to contact the face of the lateral arm of carriage 67 and fixedly hold connecting rod 78 and carriage 67 in fixed relative position with respect to each other. By suitably varying the amount that rod 78 is threaded into carriage 67, the distance to travel of carriage 67 with respect to the record stack is controlled as will be discussed hereinafter. Mounted to the inner vertical surface of the base portion of carriage 67 by a screw 74 is a feed member 72 having a body portion through which screw 74 passes and an angular extension. The angular extension of feed member 72 extends above the upper surface of carriage 67 and away therefrom. Feed member 72 has a downwardly extending lip 73 at the junction of the base portion and the angular extension forming an acute angle with the upper surface of carriage 67.

The heel of the base portion of carriage 67 has a transverse opening through which a shaft 75 passes which shaft 75 is fixedly held by a set screw 77 transversely threadedly received in carriage 67. Shaft 75 extends beyond each side of carriage 67 and has a pair of wheels 80 and 81 rotatably mounted thereon. Wheels 80 and 81 are retained on shaft 75 by means of cotter pins or other like means. Wheels 80 and 81 are received in elongated slots 83 and 85 which slots are cut in the upper surface of a plate 87 which is securely mounted to frame 11 illustratively shown by bolts 89 and nuts 90.

On the side of the vertically stacked records opposite to that carriage 67 is a cut-off arm 100. Arm 100 is preferably disposed along the longitudinal axis of unit 10 and in the vertical place equidistant between conveyor chains 20 and 22. Arm 100 is fixedly secured to an extension 102 of frame 11 by suitable means such as a bolt 101. Cut-off arm 100 has a downdwardly extending portion terminating in an edge adjacent rear support 65 and having a surface 104 parallel to the upper surface of rear support 65, and a surface 106 at substantially right angles to surface 104. Arm 100 is so disposed in relation to the upper surface of support 65 that the distance between horizontal surface 104 of arm 100 and the upper surface of base 65 is slightly greater than the thickness of a record. As seen in FIGURES 4 and 5, vertical surface 106 of arm 100 is in contact with the edges of the lower group of stacked records excluding bottom record 70.

Periodically attached to conveyor chains 20 and 22 are projecting lugs 110 best seen in FIGURES 3, 4 and 5. A pair of lugs 110, one on each conveyor chain 20 and 22 is aligned in a plane substantially perpendicular to the axis of conveyor chains 20 and 22, respectively. Lugs 110 may be fastened in any convenient manner to chains 20 and 22. In the present embodiment lugs 110 extend above the upper surface of conveyor chains 20 and 22 substantially equal to the thickness of a record. Similarly, in the present embodiment, lugs 110 are spaced an equal distance apart about the periphery of conveyor chains 20 and 22, respectively. The distance between adjacent lugs on each conveyor chain 20 or 22 being slightly greater than the article to be carried, being illustratively a distance of 13 inches apart for 12-inch diameter records.

Extending along the path of travel of the records through the machine and on opposite sides of the records are a pair of guide rails 115 and 116. As seen best in FIGURES 6 and 8, guide rails 115 and 116 are generally L-shaped with the base of the L transverse to the plane of the record and the inner surface of the arm of the L slidingly contacting the upper surface adjacent the outer edge of the record. It is desirable that the distance between the base portions of rails 115 and 116 be slightly greater than the largest expected diameter of the articles being cleaned. As seen best in FIG. 1, attached to the outer surface of guide rail 115 are outwardly extending arms 118 each having a slot 119 therein. Beneath slots 119 are threaded openings in U-shaped member 12 of rectangular base 11 which receives a lockscrew 121, respectively. Lockscrew 121 is substantially similar to lockscrew 59, as described hereinbefore with respect to reservoir 50. In a similar manner guide rail 116 is fixedly held in position by means of extending arms 123 and lockscrews 125. Thus the distance between guide rails 115 and 116 can be varied to fit different width articles passing through the machine. Guide rails 115 and 116 prevent the records carried by conveyor chains 20 and 22 from tipping or being vertically displaced from conveyor chains 20 and 22 as the records are being worked upon as described hereinafter.

Figure 9:
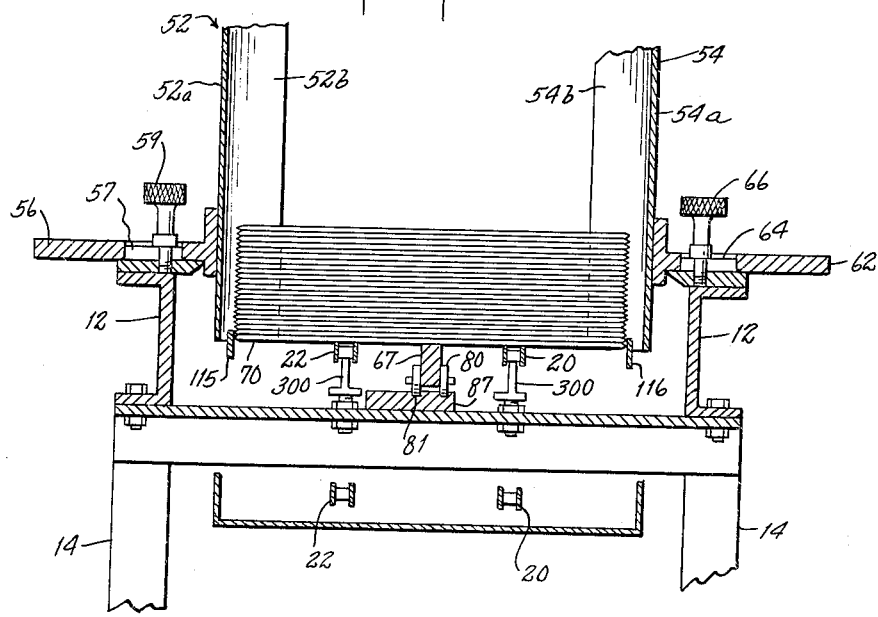
FIG. 9 is an enlarged partial cross-sectional view taken along line 9—9 of FIG. 2.

It is desirable to keep the work receiving surface of conveyor chains 20 and 22 substantially planar. To avoid sagging of the portion of chain 20 between sprocket wheels 24 and 26, and the portion of chain 22 between wheels 27 and 29, a guide rail 300 is placed along the bottom of the work receiving surface of each chain 20 and 22. As best seen in FIGS. 6, 8 and 9, guide rails 300 have an inverted T-shaped cross-section with the foot of the T supporting the chains and the base of the T supported by frame 11.

Above the work surface of conveyor chains 20 and 22, and spaced longitudinally from storage supply 50 in the plane in which the spindle holes of the records lie as the records pass through unit 10, is a high pressure nozzle 130. High presure nozzle 130 is directed downwardly facing the flow of records through unit 10, which record flow, as seen in FIGS. 1 and 2, is from left to right. Nozzle 130 is supported by a shaft 132. Nozzle holder shaft 132 is supported at its ends by brackets 134 and 136 respectively. Brackets 134 and 136 are fixedly secured to frame members 12 by any convenient means such as bolts, welding, or other types of fastening. Shaft 132 is positioned in brackets 134 and 136 to prevent rotation and longitudinal movement therein by any convenient means, illustratively shown by hex jam nuts 138. As seen in FIG. 6, nozzle 130 can be moved transversely for proper alignment with the records by the use of double, jam nuts 138 on one end of shaft 132. Jam nuts 138 are placed on both sides of bracket 134 and by proper adjustment of these hex nuts in combination with the adjustment of the hex nut on the opposite end of shaft 132, shaft 132 can be adjusted transversely and locked in the desired position.

Nozzle 130 receives a supply of high pressure fluid, which in the present embodiment is water, by a tube 141 connected to a high pressure fluid supply 702. The high pressure fluid-supply 702 is connected to any convenient source, in a manner well known in the art, and is not discussed in detail herein. For example, the high pressure supply may be a tank having a pressure regulating valve 704 connected to a pump for maintaining the desired pressure of the fluid in the tank.

Shaft 132 has a threaded opening therein for receiving a mating threaded connection on the end of tube 141. Similarly, shaft 132 has a threaded opening for receiving high pressure nozzle 130. These threaded openings in shaft 132 are interconnected so that fluid supplied via tube 141 leaves via nozzle 130.

High pressure nozzle 130 is positioned with respect to the plane in which the material to be removed lies therein so as to best perform its function. In the present embodiment for removing labels from phonograph records, it has been found that if the axis of nozzle is positioned substantially at an angle of 40° to the plane in which the articles are flowing, best results in removal will be obtained. The angle that nozzle 130 makes to the plane in which the articles can flow can be varied by loosening jam nuts 138 and rotating shaft 132 and tightening jam nuts 138 at the desired angle. It is desirable that shaft 132 be adjustable vertically in supports 134 and 136 to vary the height at which nozzle 130 lies above the plane of the record flow.

Positioned in substantially the same vertical plane as shaft 132 and beneath the work receiving surface of conveyor chains 20 and 22 is a high pressure holder shaft 145 having a high pressure nozzle 146 centrally disposed therein and lying in the same vertical plane as nozzle 130. Nozzle 146 is directed upwardly toward the bottom surface of the article carried on conveyor chains 20 and 22 and facing the direction of article flow as seen in FIG. 2. The longitudinal axis of nozzle 146 makes an angle with the bottom plane of the article to be cleaned substantially equal to the angle the axis of upper nozzle 130 makes with the upper surface of the article, which, as mentioned above, in the present embodiment, is about 40 degrees. Shaft 145 is supported by bracket holders 147 and 148 which, as shown in FIG. 6, is a continuation of brackets 134 and 136, respectively. Shaft 145 can be adjusted transversely to the record flow as well as vertically in a manner similar to that described above with respect to shaft 132. High pressure nozzle 146 receives a supply of high pressure fluid through tube or hose 151 via shaft 145. Tube or hose 151 is connected to a source of high pressure fluid 702, in a manner identical as that described above with respect to high pressure nozzle 130. It is desirable that nozzles 130 and 146 both receive their supply of high pressure fluid at substantially the same time, and it has been found that using a common tube or hose 710 from the source of high pressure fluid 702 with branches flowing to shafts 132 and 145, respectively, provides the desired results.

Downwardly along the article flow from nozzle 130 are a pair of vertically aligned brushes 160 and 161, one on each side of the work receiving surface of conveyor chains 20 and 22. Each of brushes 160 and 161 are driven and mounted in a substantially identical manner and, as viewed in FIG. 8, only the upper brush 160 need be described in detail. Corresponding elements associated with brush 161 are given the same reference numerals as the apparatus to be described hereinafter but are primed.

Brush 160 is mounted on a shaft 165 in fixed relative position thereon, in any suitable manner, such as splined or non-circular mating surface. Brush 160 is retained in place in rotative position on shaft 165 in any convenient manner such as between collars 168 which are held flush against the lateral surfaces of brush 160 by nuts 166. Preferably, shaft 165 is rotatably journaled in parallel spaced relation with respect to nozzle support shaft 132. Shaft 165 is continuously rotated in the sense indicated by the arrow adjacent to it, as shown in FIG. 2 by suitable means such as a pulley 171 which is rotated by a belt 173 which is driven in turn by a pulley 175 on a suitable motor 177. Shafts 165 is suitably journaled in brackets 179 and 180, described below, such as by means of an anti-friction bearing arrangement 181, shown in FIG. 8. Brackets 179 and 180 are pivotally mounted about the axis of a shaft 183, which is substantially parallel to the axis of shaft 165. As shown in FIG. 7, shaft 183 is substantially rectangular in cross-section adjacent each of its ends and the rectangular cross-sectional portion is designated as 183a. Each of portions 183a of shaft 183 has a pair of transverse openings through which bolts 185 pass therethrough. Shaft 183 is rotatably journaled in a pair of brackets 187 and 189, which are fixedly attached to U-shaped members 12 of frame 11, by means of bolts 190 or other convenient means.

As indicated above, brush shaft 165 is rotatably journaled in brackets 179 and 180. Bracket 179 is a mirror image of bracket 180 and hence only bracket 180 will be described further. As seen in FIG. 7, bracket 180 is substantially elongated in shape having adjacent one end suitable journal means such as a ball bearing arrangement 181 for rotatably supporting shaft 165. At the opposite end of bracket 180 transverse the axis of shaft 165 are a pair of threaded openings for receiving bolts 185 passing through portion 183a of shaft 183. Intermediate of shaft 165 and the threaded openings for bolts 185 is an opening 192 having an axis substantially parallel to shaft 165. A stud 195 has a transverse aperture through its enlarged head at one end and is threaded at the other. Positioned on the shank of stud 195 and resting against the head thereof is a helical spring 196. Bracket 189 has an arm extending over bracket 180 having an opening therein, which opening has a longitudinal axis that intersects the longitudinal axis of opening 192 in bracket 180. Stud 195 passes upwardly through opening 197 and a thumb nut 200 is threadedly mounted on the upper end of stud 195. The aperture in the head of stud 195 is axially aligned with opening 192 in bracket 180 and a pin 202 is passed through both openings and secured therein to prevent displacement of stud 195, such as by cotter pins, bolts, or the like. Upon thumb screw 200 being threaded onto stud 195, bracket 180 is pivoted about the longitudinal axis of shaft 183, thus moving brush shaft 165 relative to the work receiving surface of conveyor chains 20 and 22. Bracket 179 is identical to bracket 180 and like numerals designate like elements. Brush shaft 165 is preferably positioned so that the outer periphery of brush 160 is slightly below the surface to be cleaned of the article on conveyor chains 20 and 22. As the article passes beneath brush 160, brush 160 is forced upwardly slightly, which in turn pivots shaft 165 and brackets 179 and 180 clockwise about the longitudinal axis of shaft 183. Due to action of compression spring 196, brush 160 is continuously urged into contact with the surface to be cleaned. The arrangement and manner of operation of brush 160 thus far described is repeated with respect to brush 161 which is a symmetrical mirror image version thereof for the undersurface of the records to be cleaned.

As shown in FIG. 8, the space between brushes 160 and 161 is slightly less than the thickness of the records passing therethrough, so that brushes 160 and 161 are spring urged against a respective surface of the record. Since the spring force applied to the record by each brush is substantially equal and in an oppostie direction, there is no unbalanced force exerted on the record to displace the record from the work receiving surface of conveyor chains 20 and 22.

In the present embodiment, since even the smallest piece of label not removed from the phonograph record could contaminate a large number of future records, the high pressure spray and brushing elements as described above are repeated for another cycle. As seen in FIGS. 1 and 2, the arrangement of high pressure spray nozzles 130 and 146 and brushes 160 and 161, together with their associated structures as described above, are repeated and the apparatus used is substantially identical with that described hereinbefore and the same reference numbers will be used to designate identical elements, with the exception that the number 500 will be added to each reference numeral, so that the second set of high pressure nozzles will be 630 and 646, respectively and the second set of brushes will be 660 and 661, respectively.

Spaced from and parallel to drive shaft 33 are a pair of parallel rollers 210 and 212, having resilient peripheral surfaces. As shown best in FIGS. 10 and 12, roller 210 is rotatably supported by U-shaped beams 12 of frame 11. Adjacent one end of roller 210 and securely attached thereto is sprocket wheel 46, which is rotated by chain 38, as described hereinbefore. Idler roller 212 is freely rotatably mounted in brackets 216, shown in FIG. 11. Idler roller 212 is resiliently urged against driving roller 210 by gravitational force. Brackets 216 are pivotally mounted about the axis of a shaft 218, which is rotatably mounted to beams 12 of frame 11 by means of screws 219. As seen in FIG. 10, roller 212 is maintained in frictional engagement with driven roller 210 due to the gravitational movement about the axis of shaft 218. Rollers 210 and 212 are so positioned that their line of contact is in the same plane as the horizontal symmetrical plane of the records on conveyor chains 20 and 22, so that the records leaving the end of chains 20 and 22 are received between rollers 210 and 212. Due to the frictional contact between rollers 210 and 212 they grasp and transport forward the records leaving conveyor chains 20 and 22. It should be noted that by proper choice of the angular speed of sprocket wheel 46 in conjunction with the radius of rollers 210 and 212, the peripheral speed of rollers 210 and 212 can be equal to the flow of articles on conveyor chains 20 and 22 or varied therewith. Due to the resilient surfaces of rollers 210 and 212, a wiping action occurs as an article passes between these rollers. Thus, if any cleaning fluid remains on the articles cleaned, the fluid will be substantially all removed upon the article passing between rollers 210 and 212.

Parallel to shafts 210 and 212 and straddling the line of contact between rollers 210 and 212 are a pair of hollow shafts 224 and 222 securely mounted between U-shaped beams 12 and frame 11. Hollow shafts 222 and 224 are coupled by a suitable pipe or tube to a source of air under pressure, such as a tank connected to a compressor, both not shown. Hollow shafts 222 and 224 have a series of holes spaced longitudinally along their axes, so that a plurality of jets of air impinge on the surfaces of the records leaving the line of contact of rollers 210 and 212. The jets of air on both surfaces of the records should preferably be fan-shaped, so as to keep the record in the path of the air jets for a maximum period. The jets of air from tubes 222 or 224 remove the last traces of the cleaning fluid, but if necessary the air jets may be repeated.

High pressure nozzles 130 and 146 are of such a shape that the high pressure fluid leaving the nozzles forms a fan-shaped spray having a knife-like edge. The high velocity spray upon striking the articles to be cleaned has a high impact force. The high impact sprays remove any superficial impurities or contamination from the surfaces to be cleaned. In the present embodiment, nozzles 130 and 146 receive the high pressure fluid just prior to the leading edge of the label on the surface of the phonograph record, shown as record 714 in FIGURE 14, facing the respective nozzles comes into the zone of high pressure spray emanating from the nozzles 130 and 146. The time sequence of supplying high pressure nozzles 130 and 146 with the high pressure fluid can be accomplished in any convenient manner such as a cam arrangement for actuating an air cylinder which in turn controls the flow of the high pressure fluid supply. As shown in FIGURE 1, adjacent the rear edge of drive shaft 33, is fixedly keyed a disc cam 226. The profile of cam 226 is best seen in FIG. 13, where a portion designated 227 has a larger diameter than the remaining portion of disc cam 226. The circumferential distance or arc length of portion 227 determines the length of time that the high pressure fluid is fed to the high pressure nozzles 130 and 146. Contacting the peripheral surface of cam 226 is a cam follower 228. Upon cam follower 228 being displaced by portion 227 of cam 226, an air cylinder 708, is actuated, which in turn actuates a valve 706 for supplying high pressure nozzles 130 and 146 via conduit 710 with the high pressure fluid. Correctly positioning cam 226 on drive shaft 33 for feeding the high pressure fluid source to high pressure nozzles 130 and 146 is a matter of proper positioning of the cam 226 with the rate of phonograph record flow through apparatus 10, as well as adjustment of the angle that high pressure nozzles 130 and 146 make with the surface of their respective phonograph records. Once this position is determined, a proper sequence of fluid flow will result as long as the rate of speed of the conveyor chains remains constant.

High pressure nozzles 630 and 646 are supplied with the high pressure fluid in a similar manner and a cam 240 is keyed on drive shaft 33 which displaces cam follower 242 for actuating the high pressure fluid supply. Cam 240 actuates cam follower 242, which in turn actuates a cylinder 708, which actuates a valve 707 to supply nozzles 630 and 646 with high pressure fluid via conduit 712. As shown, cams 226 and 240 are 180 degrees out of phase, which is the result of the displacement of high pressure nozzles 630 and 646 from nozzles 130 and 146 along the path of travel of the records. By proper positioning of nozzles 130 and 146 and 630 and 646 so that the leading edge of the labels on each side of the record reaches the edge of the high pressure spray simultaneously, one cam for supplying the high pressure fluid to the nozzles may be used. The positioning of cam 240 on shaft 33, as discussed above with respect to cam 226 is a matter of choice depending on the location of high pressure nozzles 630 and 646 with respect to the record flow.

While one method of controlling the high pressure fluid source has been shown using cams, this is purely illustrative since other methods may be devised, such as photocells, limit switches, and solenoid control valves. For example, in FIGURE 15 is shown apparatus for actuating nozzles 130 and 146 in response to record 720 entering the zone of spray from nozzles 130 and 146. Record 720 actuates a limit switch 722 which operates solenoid 728 for opening a valve 732. Fluid under pressure from pump 704 flows via conduit 700 through valve 732 through conduits 710, 151 and 141 to nozzles 130 and 146. Similarly, nozzles 630 and 646 receive high pressure fluid via conduits 712, 641 and 651 in response to record 734 actuating switch 736, which in turn actuates solenoid 739 for opening valve 740. After passage of records 720 and 734, corresponding switches 722 and 736 are deactuated. Also, depending on the article to be cleaned, the high pressure fluid may be supplied continuously to the nozzles.

In order to prevent the fluid from splattering adjacent work surfaces, it is desirable to enclose the entire unit with some type of covering. As seen best in FIGS. 2 and 6, the entire unit is covered preferably by a stainless steel covering designated generally as 250. Covering 250 is segmented, using joints 251 for ease in assembling the covering. The portion beneath the apparatus is downwardly oriented, so as to collect all of the fluid and an outlet pipe 253 is connected to the lowermost portion of cover 250 for removing the fluid and impurities. The used fluid and impurities are taken to a storage center where the fluid may be cleaned and re-used, if desired. While one form of covering has been shown, other types with other materials may be used by those skilled in the art.

In use, the phonograph records to be cleaned are stacked between vertical members 52 and 54 in any suitable manner. As shown, the records are stacked by hand but by suitable modification the supply of records may be fed automatically into storage supply 50. Vertical members 52 and 54 correctly align the stacked records in a vertical orientation so that the spindle hole is substantially along the longitudinal axis of the machine which coincides with the center line between the conveyor chains 20 and 22.

In the present embodiment, conveyor chains 20 and 22 are continuously rotated so that the work receiving surface which is the upper surface in the present embodiment, moves from left to right in FIGS. 1, 2, 4, 5 and 10. If desired, the conveying means may be moved in periodic sequences. Lugs 110 fastened to conveyor chains 20 and 22 are spaced every thirteen inches. As seen best in FIGS. 3, 4 and 5, as lugs 110 approach the record stack, cam 59 begins to oscillate, primary cam follower 73. The oscillating motion of primary cam follower 73 is converted into a translating motion in the secondary follower consisting of connecting rod 78 and carriage 67.

As seen in FIG. 4, when primary follower arm 73 is in its normal position, bottom record 70 rests on the upper surfaces of carriage 67 and base plate 65, with feed member 72 not contacting the records and lug 110 is approximately an inch away from the rear edge of bottom record 70. As conveyor chains 20 and 22 continue to rotate, lugs 110 approach the record stack and an edge of record 64. Also cam 69 urges roller 71 of primary follower arm 73 outwardly, thus forcing carriage 67 forwardly or to the right, as seen in FIG. 5. The upper surface of carriage 67 slides along the bottom surface of record 70. All of the lower groups of records in the vertical stack between vertical members 52 and 54, except the bottommost record 70, are prevented from moving forwardly or to the right by the vertical surface 106 of cutoff arm 100. Vertical surface 106 rests against the leading edges of the bottom group of records, preventing their forward movement. However, the horizontal space between bottom surface 104 of arm 100 and the upper surface of base 65 is slightly greater than the thickness of a record permitting record 70 to pass therebetween. As carriage 57 continues to move in a forward direction, member 72 comes into contact with the rear edge of the stack of records. Lip 73 of member 72 is sufficient to contact only the peripheral edge of bottom record 70. Due to the wedge-like surface of lip 73 of member 72, the leading edge of lip 73 enters between the bottom record 70 and the next upper abutting record. Carriage 67 continues to move forward, thus moving feed member 72 forward, and bottom record 70 is pushed forwardly along the upper surface of base 65 between bottom surface 104 of cutoff arm 100 and the upper surface of base 65, as seen best in FIG. 5. The remaining records above bottom record 70 are prevented from moving forward due to vertical surface 106 of cutoff arm 100, and they slide up the wedge-like upper surface of the member 72 to a position as seen in FIG. 5. This position is maintained for a short period by cam 69 until lugs 110 contact the rear peripheral edge of record 70, as seen best in FIG. 3. Lugs 110 project above the surface of conveyor chains 20 and 22 substantially the same distance as the thickness of a record. Lugs 110 urge record 70 past arm 100 and off support 65 and carriage 67 onto conveyor chains 20 and 22. Cam 69 continues to rotate allowing primary cam follower 73 to return to its normal position and urging carriage 67 back from the record stack to its starting position shown in FIG. 4. Another record is resting again on the upper surface of base 65 and the upper surface of carriage 67.

The record 70 carried on conveyor chains 20 and 22 is moved positively forward by lugs 110. The portions of record 70 adjacent the outer edges of the record pass under guide rails 115 and 116 as seen in FIG. 6 for preventing any vertical displacement of the record; and as the leading edge of label 750 of the phonograph record approaches the high pressure nozzles 130 and 146, cam 226 actuates follower arm 228 furnishing a supply of high pressure fluid to the high pressure nozzles 130 and 146 in the manner as described above. The high velocity spray lifts up almost all of label 750 as seen in FIG. 1 and the record progresses. Any particles of the label embedded in the record are substantially removed by the high impact action of the high velocity spray. The removal of the labels from both surfaces of the record is performed substantially simultaneously by the positioning of high pressure nozzles 130 and 146. It should be noted that the spray cleans the surface regardless of its shape, so that even a non-uniform article can be used with the present apparatus. The used fluid and the particles of the label are washed to the bottom portion of the covering 250 out the drain 253 to settlement tank or to sewage.

The record is continuously moved forward by action of lugs 110 and the leading edge of the record approaches the opening between brushes 160 and 161. The opening between brushes 160 and 161 is slightly less than the thickness of the record, so that the brushes are separate and spring-tensioned downwardly providing a positive brushing pressure for thorough cleaning of the surface. In one embodiment, the brushes were made from stainless steel wire one ten-thousandths of an inch in diameter and rotated at 2400 r.p.m. However, for other articles to be cleaned and for other surfaces where non-marring is of prime importance, the brushes may be made from softer materials and different speeds. The rotation of the brushes at the point of contact are preferably in a direction opposite to that of flow, so that the records are maintained in positive contact with lugs 110. As the records emerge from between brushes 160 and 161, the process of spraying and of further brushing from the high pressure nozzles 630 and 646 and brushes 660 and 661 is substantially the same as described above. As the records emerge from the second pair of brushes 660 and 661, they are conveyed by conveyor chains 20 and 22 to rollers 210 and 212.

Drive roller 210 continuously rotates idler roller 212 due to the friction between their contacting surfaces. The record enters between rollers 210 and 212 and due to the force of gravity on roller 212, a firm force is exerted on the record. Due to the resilient surfaces on rollers 210 and 212, almost all of the fluid is removed from the record surfaces. As the record emerges from between rollers 210 and 212, a series of jets of air from pipes 222 and 224 impinges both sides of the record, thus substantially drying the record. The records are removed by any suitable means, such as by stacking, chutes, or the like, for storage or for further processing.

The present invention thus produces an apparatus adapted to remove any surface impurities or securely attached articles such as by glue or bonding, and remove these surface impurities in a manner allowing full use of automatic machinery. The present invention allows removal of surface impurities on irregular surfaces which normally required grinding.

While the conveying means are shown as a pair of conveyor chains, other conveying means may be utilized by those skilled in the art, such as having an elongated aperture therein or having a plurality of apertures.

Many apparently different structures may be readily devised by those skilled in the art without departing from the scope of the present invention, and it is understood that the foregoing description is illustrative only, the scope of the invention being defined solely by the claims granted.

What is claimed is:

1. Apparatus for removing a label from a flat surface on a conveyed article comprising a source of high pressure fluid, a nozzle faced and inclined towards the direction from which said article is conveyed and connected to said source of high pressure fluid for receiving the fluid therefrom, and means cooperating with said nozzle to provide a fan-shaped high pressure spray of fluid at an angle toward and transversely of said label, said means further providing said spray from said nozzle with a knife-like edge impinging transversely of said label on said surface in a direction toward said advancing article, said spray covering a zone through which said surface is conveyed.

2. The apparatus of claim 1 further including means operatively controlling the flow of high pressure fluid from said high pressure source for selectively establishing and interrupting the flow of a fluid from said nozzle.

3. The apparatus of claim 1 further including a brush rotatably mounted to the rear of said nozzle and being positioned so that said brush contacts the sprayed surface of said article, and means for rotating said brush.

4. The apparatus of claim 3 further including means operatively connected to said high pressure source for controlling the flow of high pressure fluid to said nozzle, means for selectively actuating said flow controlling means for establishing and interrupting said fluid flow to said nozzles to spray said label containing surface of said article, and means removing excess fluid from said article before said article leaves said apparatus.

5. Apparatus for removing labels simultaneously from both surfaces of conveyed phonograph records, comprising a source of high pressure fluid, a pair of nozzles faced and inclined towards the direction from which said records are conveyed, each of said nozzles being connected to said source of high pressure fluid for receiving the fluid therefrom, means cooperating with said nozzles to provide a fan-shaped high pressure spray of fluid at an angle toward and transversely of said corresponding labels, said means further providing said spray from said nozzles with a knife-like edge impinging transversely of said labels on said surfaces in a direction toward said advancing records and covering the zone through which said surface is conveyed, a pair of brushes rotatably mounted to the rear of said nozzles, one of said brushes positioned above the upper surface of said conveyed records and the other of said brushes positioned below the lower surface of said conveyed records, each brush having a brushing surface contacting the sprayed surface of said record on its corresponding side, means for rotating said brushes, and means operatively controlling the flow of high pressure fluid from said nozzles for selectively establishing and interrupting the flow of fluid from said nozzles.

6. The apparatus of claim 5 wherein said last-mentioned means being responsive to the entry and departure of said record from said spray zone for selectively actuating said flow controlling means to establish the flow of fluid through said nozzles when said record is in said spray zone.

References Cited by the Examiner

UNITED STATES PATENTS

| | | | |
|---|---|---|---|
| 1,018,046 | 2/12 | Goldman | 134—72 X |
| 1,021,007 | 3/12 | Smith | 15—77 |
| 1,687,201 | 10/28 | Hagen | 15—77 |
| 1,817,332 | 8/31 | Worrall | 15—77 |
| 2,291,553 | 7/42 | Mathy | 15—77 |
| 2,379,789 | 7/45 | Cozzoli | 134—72 |
| 2,439,305 | 4/48 | Johnson | 15—77 |
| 2,509,622 | 5/50 | Woolcott | 214—8.5 |
| 2,652,841 | 9/53 | Kurt | 134—72 X |
| 2,688,413 | 9/54 | Donehower | 214—8.5 |
| 2,764,170 | 9/56 | Messler et al. | 134—131 X |
| 2,781,534 | 2/57 | Cochran | 15—77 |
| 2,838,188 | 6/58 | Mason | 214—8.5 |
| 3,060,477 | 10/62 | Wechsler | 15—77 |

FOREIGN PATENTS 1,217,695  12/59  France.

WALTER A. SCHEEL, *Primary Examiner.*

S. JAMES, CHARLES A. WILLMUTH, *Examiners.*